United States Patent [19]

Fringeli

[11] Patent Number: 4,605,511
[45] Date of Patent: Aug. 12, 1986

[54] STABLE STILBENE FLUORESCENT BRIGHTENER SOLUTION

[75] Inventor: Werner Fringeli, Laufen, Switzerland

[73] Assignee: Ciba-Geigy Corporation, Ardsley, N.Y.

[21] Appl. No.: 397,273

[22] Filed: Jul. 12, 1982

Related U.S. Application Data

[63] Continuation of Ser. No. 251,834, Apr. 8, 1981, abandoned, which is a continuation of Ser. No. 55,418, Jul. 6, 1979, abandoned.

[30] Foreign Application Priority Data

Jul. 17, 1978 [CH] Switzerland ..................... 7707/78

[51] Int. Cl.$^4$ ............................................. C09K 11/06
[52] U.S. Cl. ........................ 252/301.21; 252/301.22; 252/301.23; 252/301.24
[58] Field of Search ............. 252/301.22, 301.23, 252/301.21

[56] References Cited

U.S. PATENT DOCUMENTS 3,871,898 3/1975 Reinert et al. ............ 252/301.23 X
4,093,645 6/1978 Davidson et al. ......... 252/301.22 X

FOREIGN PATENT DOCUMENTS 2264120 10/1975 France .
535321 5/1973 Switzerland .
1453261 10/1976 United Kingdom .

Primary Examiner—Arthur P. Demers
Attorney, Agent, or Firm—Edward M. Roberts; Kevin T. Mansfield

[57] ABSTRACT

Stilbene fluorescent brightener solutions which are stable to metal ions and metal catalysts and contain a stilbene fluorescent brightener substituted by sulfo groups and a fatty amine oxyalkylation product of the formula

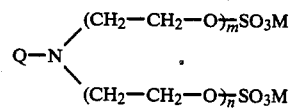

in which Q is an aliphatic hydrocarbon radical having 12 to 22 carbon atoms, M is hydrogen or an alkali metal ion, ammonium ion or amine salt ion and m and n are integers, the sum of m and n being at least 2 and not more than 50, and their use for the fluorescent brightening of natural and synthetic fibrous materials.

2 Claims, No Drawings

STABLE STILBENE FLUORESCENT BRIGHTENER SOLUTION

This is a continuation of application Ser. No. 251,834 filed on Apr. 8, 1981, now abandoned which is a continuation of Ser. No. 055,418 filed July 6, 1979, now abandoned.

The present invention relates to a solution, which is stable on storage, of stilbene fluorescent brighteners which contain sulfo groups and are stable to metal ions and metal catalysts, a process for the fluorescent brightening of natural and synthetic fibrous materials with the aid of these solutions and a fluorescent brightener bath containing the said solutions.

Solutions of stilbene fluorescent brighteners which contain sulfonic acid groups are unstable in the presence of metal ions and/or metal catalysts. Troublesome metal ions are, in particular, alkaline earth metal ions and heavy metal ions. On the one hand, such ions (calcium and magnesium) come into contact with the fluorescent brighteners through non-softened water during the preparation or dilution of solutions, for which reason it was hitherto impossible to prepare stable solutions of such stilbene fluorescent brighteners, or fluorescent brightener baths containing them, using water which contains ions. On the other hand, heavy metal ions, and also magnesium ions, are introduced into baths containing stilbene fluorescent brighteners by crosslinking catalysts for finishing the textile, for example $MgCl_2$, $ZnCl_2$ and the like, and the fluorescent brightener frequently precipitates out of the baths.

It has now been found, surprisingly, that this disadvantage can be overcome if a fatty amine oxyalkylation product is added to the solutions or fluorescent brightener baths as a stabilising assistant. Furthermore, fluorescent brightener solutions or baths which are stable to acid are obtained in this manner, which is of great advantage in a number of application processes.

The aqueous stilbene fluorescent brightener solution, which is stable to metal ions and metal catalysts, according to the invention contains a stilbene fluorescent brightener containing sulfonic acid groups and a stabilising fatty amine oxyalkylation product of the formula

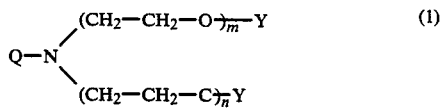 (1)

in which Y is a $-SO_3M$ group, in which M is hydrogen or an alkali metal ion, ammonium ion or amine salt ion, Q is an aliphatic hydrocarbon radical having 12 to 22, preferably 14 to 22, carbon atoms and m and n are integers, the sum of m+n being at least 2 and not more than 50, preferably at least 2 and not more than 30 and especially at least 4 and not more than 12.

An alkali metal ion M is, in particular, the sodium ion or potassium ion, and an amine salt ion is the ion of a monoalkanolamine, dialkanolamine or trialkanolamine. M is preferably the ammonium ion.

The fatty amine oxyalkylation products are prepared in a manner known per se by addition of 2 to 50 mols of ethylene oxide onto aliphatic amines which contain an aliphatic hydrocarbon radical having 12 to 22 carbon atoms, and converting the adduct of the formula (1) in which Y is hydrogen into the ester with sulfuric acid or a functional derivative thereof, and if desired converting the resulting ester into the abovementioned salts. Functional derivatives of sulfuric acid are halides, esters and amides, for example chlorosulfonic acid and, in particular, sulfamic acid.

The esterification is as a rule carried out by simply mixing the reactants whilst warming, advantageously to a temperature of between 50° and 100° C. The free acid first formed can then be converted into the corresponding alkali metal salts or ammonium salts. Conversion into the salts is effected in a conventional manner by adding bases, for example ammonia, monoethanolamine, triethanolamine or alkali metal hydroxides, for example sodium hydroxide or potassium hydroxide. In a most preferred embodiment, sulfuric acid esters are prepared direct in the form of their ammonium salts by warming the ethylene oxide adducts with sulfamic acid, advantageously in the presence of urea.

Fatty amine oxyalkylation products of the formula

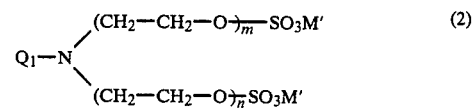 (2)

in which $Q_1$ is an alkyl or alkenyl radical having 12 to 22, preferably 14 to 22, carbon atoms, M' is hydrogen or an alkali metal ion or ammonium ion and m and n are integers, the sum of m and n being 4 to 12, are of particular practical interest.

The radical Q or $Q_1$ does not need to have a quite definite number of carbon atoms, but can also be a mixture of hydrocarbon chains of varying lengths, as is the case, for example, with many fatty amines which are derived from natural fats. Mixtures of compounds of the formulae (1) and (2) can also be employed.

The most preferred ester of the formula (2) is the ammonium salt of the reaction product of 1 mol of tallow fatty amine with 6 to 8 mols of ethylene oxide.

The stilbene fluorescent brighteners are, in particular, those from the class of bis-triazinyl-amino-stilbene-disulfonic acids and of bis-stilbene-disulfonic acids. Examples of such fluorescent brighteners are compounds of the formula

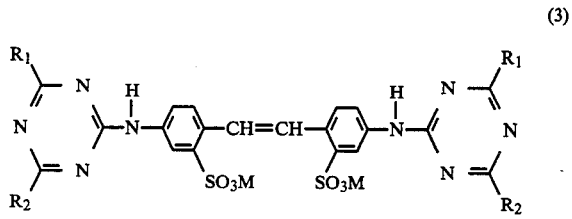 (3)

in which M is hydrogen or an alkali metal ion, ammonium ion or amine salt ion and $R_1$ and $R_2$ are $NH_2$, $NH-CH_3$, $NH-C_2H_5$, $N(CH_3)_2$, $N(C_2H_5)_2$, $NH-CH_2-CH_2-OH$, $NH-CH_2-CH_2-CH_2-OH$, $N(CH_2-CH_2-OH)_2$, $N(CH_2-CH_2-CH_2-OH)_2$, $N(CH_3)(CH_2-CH_2-OH)$, $NH-CH_2-CH_2-O-CH_2-CH_2-OH$, $NH-CH_2-CH_2-SO_3M$, $OH$, $OCH_3$, $OCH(CH_3)_2$, $O-CH_2-CH_2-O-CH_3$,

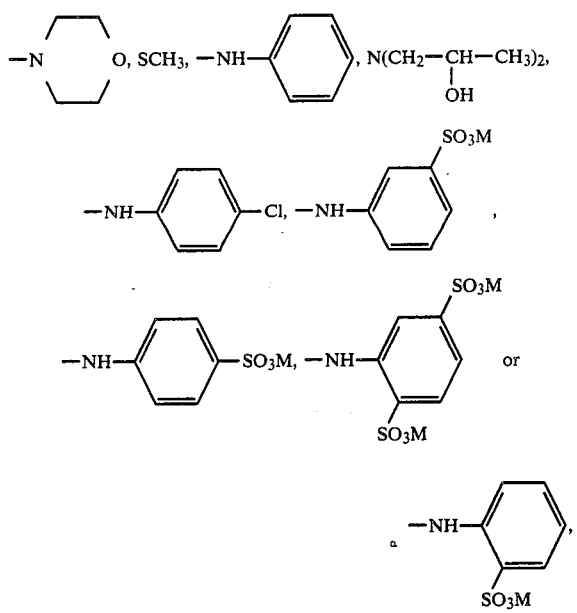

and of the formula

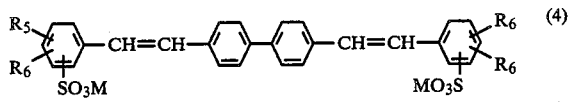

in which $R_5$ is hydrogen, alkyl having 1 to 5 carbon atoms, alkoxy having 1 to 5 carbon atoms, halogen or $SO_3M$, $R_6$ is hydrogen or alkyl having 1 to 4 carbon atoms and M is hydrogen or an alkali metal ion, ammonium ion or amine salt ion.

A preferred stilbene fluorescent brightener is that of the formula

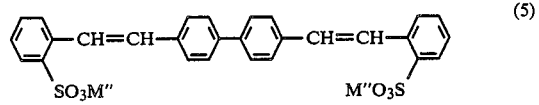

in which M'' is hydrogen or sodium.

The stilbene fluorescent brightener of the formula (5) is preferably used together with a fatty amine oxyalkylation product of the formula

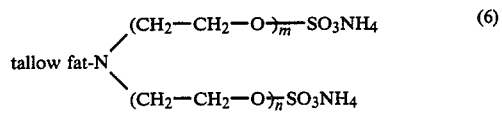

in which m and n are integers, the sum of m and n being 6 to 8.

Fluorescent brightener solutions, according to the invention, of less water-soluble stilbene fluorescent brighteners can additionally contain one or more hydrophilic organic solvents. Solvents which can be used are: lower monohydric alcohols, polyhydric alcohols, ether alcohols, lower molecular polyglycols or carboxylic acid amides. Examples of such solvents are propanol, isopropanol, ethylene glycol, propylene glycol, butylene glycol, glycerol, ethylene glycol monomethyl, monoethyl, monopropyl or monobutyl ether, dipropylene glycol, formamide, dimethylformamide, dimethylacetamide and N-methylpyrrolidone. Ethylene glycol and polyethylene glycols are particularly preferred in this context. It can frequently be advantageous to add assistants such as inorganic or organic acids, for example hydrochloric acid, acetic acid or formic acid, or also non-ionic surfactants, to the solutions according to the invention.

After appropriate dilution, the stilbene fluorescent brightener solutions according to the invention are outstandingly suitable for the fluorescent brightening of natural and synthetic fibrous materials, the fluorescent brightening preferably being effected by the exhaust method or padder method.

Fibrous materials are preferably those of polyamide, cellulose and mixtures of polyesters and cellulose, as well as wool.

The liquor used can be prepared by adding the fluorescent brightener solution, according to the invention, as such to the liquor or adding the components of this fluorescent brightener solution individually to the liquor.

The fluorescent brightening of the fibrous material is effected at temperatures between 20° and 100° C., preferably at 30° to 60° C., depending on the nature of the fluorescent brightener, solvent mixture and assistant employed.

Solutions according to the invention preferably contain 10 to 60 parts of fatty amine oxyalkylation product of the formula (1), 5 to 30 parts of one of the above-mentioned stilbene fluorescent brighteners and 10 to 85 parts of water, and not more than ⅓ of the water can be replaced by a hydrophilic organic solvent.

The solutions according to the invention are added to the baths used in amounts such that the final concentration of fluorescent brightener is between 0.0001 and 0.8, preferably 0.0005 and 0.5, percent by weight, relative to the fibrous material to be subjected to fluorescent brightening.

The following examples illustrate the invention. Percentages are by weight.

The following reaction products are examples of the assistant used according to the invention.

$A_1$ The ammonium salt of the acid di-sulfuric acid ester of the formula

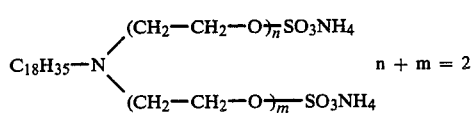

$A_2$ The ammonium salt of the acid di-sulfuric acid ester of the formula

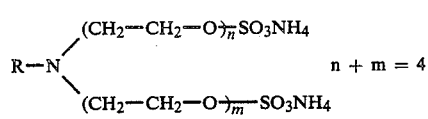

R = the hydrocarbon radical of tallow fat amine $A_3$ The ammonium salt of the acid di-sulfuric acid ester of the formula

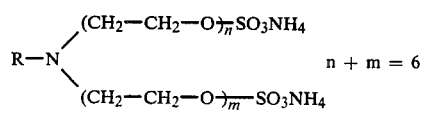

R = the hydrocarbon radical of tallow fat amine
A₄ The ammonium salt of the acid di-sulfuric acid ester of the formula

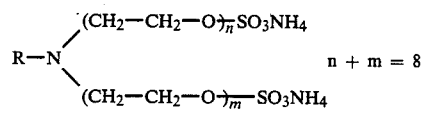

R = the hydrocarbon radical of tallow fat amine
A₅ The ammonium salt of the acid di-sulfuric acid ester of the formula

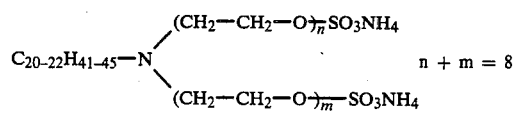

EXAMPLE 1

10 g of the fluorescent brightener of the formula

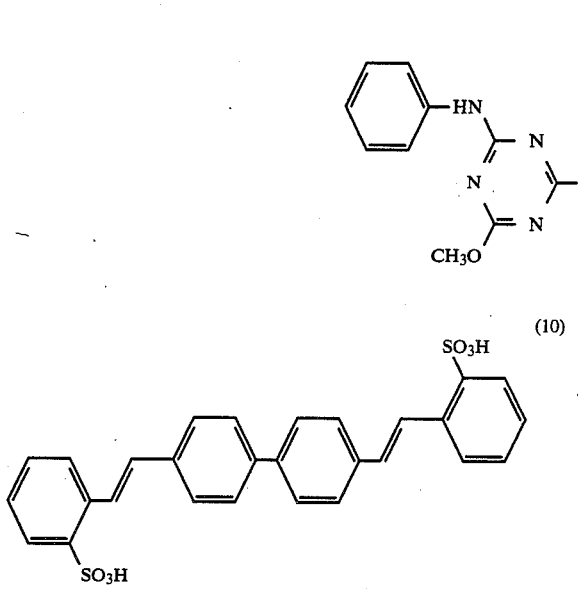

are introduced into a solution of 22.5 g of the compound A₄ in 67.5 g of water at 50° to 60° C. and the mixture is stirred at 50° to 60° C. for 15 minutes. A solution which is stable on storage and which can be diluted with water to any desired extent without the fluorescent brightener precipitating is obtained.

EXAMPLE 2

10 g of the fluorescent brightener of the formula

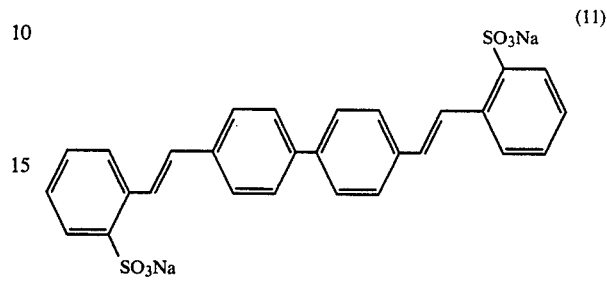

are introduced into a solution of 22.5 g of the compound A₄ in 67.5 g of water at 50° to 60° C. and the mixture is stirred at 70° to 80° C. for 15 minutes. A solution which is stable on storage and which can be diluted with water to any desired extent without the fluorescent brightener precipitating is obtained.

EXAMPLE 3

10 g of a fluorescent brightener of the formula

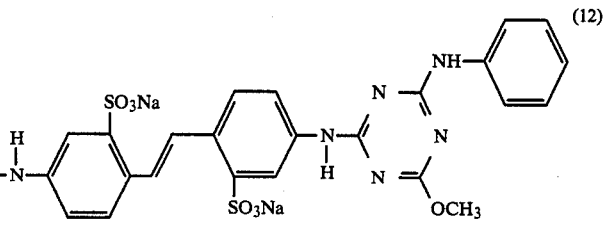

are introduced into a solution of 22.5 g of the compound A₄ in 67.5 g of water to 70° to 80° C. and the mixture is stirred at 70° to 80° C. for 30 minutes. A solution which is stable on storage and which can be diluted with water to any desired extent without the fluorescent brightener precipitating is obtained.

EXAMPLE 4

10 g of the fluorescent brightener of the formula

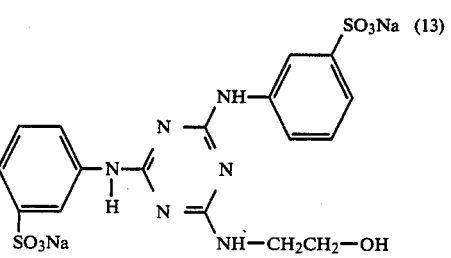

are introduced into a solution of b 22.5 g of the compound A₄ in 67.5 g of water at 70° to 80° C. and the mixture is stirred at 70° to 80° C. for 45 minutes. A solution which is stable on storage and which can be diluted with water to any desired extent without the fluorescent brightener precipitating is obtained.

EXAMPLE 5

25 g of the fluorescent brightener of the formula

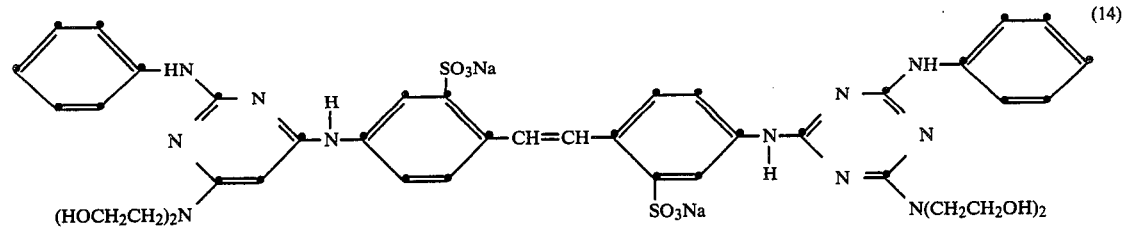

are introduced into a solution of 32 g of the compound $A_4$ in 43 g of water at 70° to 80° C. and the mixture is stirred at 70° to 80° C. for 45 minutes. A solution which is stable on storage and which can be diluted with water without the fluorescent brightener precipitating is obtained.

EXAMPLE 6

10 g of the fluorescent brightener of the formula (11) are introduced into a solution of 22.5 g of the compound $A_4$ in 40 g of water and 37 g of polyethylene glycol 3000 at 50° to 60° C. and the mixture is stirred at 70° to 80° C. for 15 minutes. A solution which is stable on storage and can be diluted with water without the fluorescent brightener precipitating is obtained.

If polyethylene glycol is replaced by ethylene glycol, a solution which is stable on storage is likewise obtained.

If the oxyethylene product $A_4$ in Examples 1 to 6 is replaced by equivalent amounts of the corresponding products $A_1$ to $A_3$ and $A_5$, fluorescent brightener solutions which are stable on storage and can be diluted with water to any desired extent are likewise obtained.

EXAMPLES 7–19

If in each case 10 g of the fluorescent brighteners of the general formula

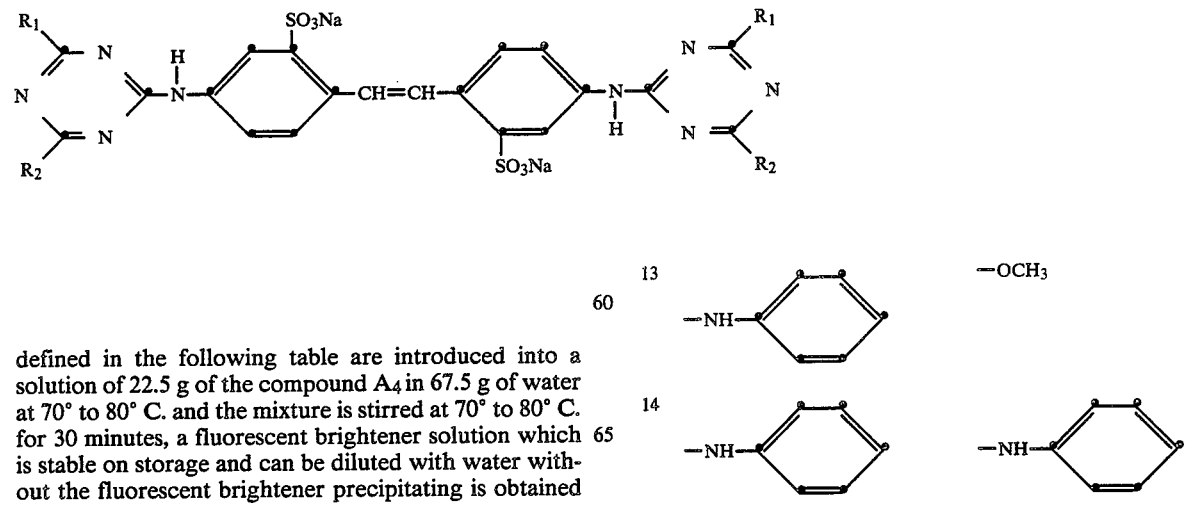

defined in the following table are introduced into a solution of 22.5 g of the compound $A_4$ in 67.5 g of water at 70° to 80° C. and the mixture is stirred at 70° to 80° C. for 30 minutes, a fluorescent brightener solution which is stable on storage and can be diluted with water without the fluorescent brightener precipitating is obtained in each case.

TABLE

| Example | $R_1$ | $R_2$ |
|---|---|---|
| 7 | —NH—C$_6$H$_4$—SO$_3$Na | —N(CH$_2$CH$_2$OH)$_2$ |
| 8 | —NH—C$_6$H$_4$—SO$_3$Na | —N(CH$_3$)(CH$_2$CH$_2$OH) |
| 9 | —NH—C$_6$H$_5$ | —N(CH$_3$)(CH$_2$CH$_2$OH) |
| 10 | —NH—C$_6$H$_5$ | —NH(CH$_2$)$_3$—O—CH$_3$ |
| 11 | —NH—C$_6$H$_5$ | —N(morpholino) |
| 12 | —SCH$_3$ | —N(morpholino) |
| 13 | —NH—C$_6$H$_5$ | —OCH$_3$ |
| 14 | —NH—C$_6$H$_5$ | —NH—C$_6$H$_5$ |

TABLE-continued

| Example | R₁ | R₂ |
|---|---|---|
| 15 | —NH—(benzene ring with SO₃Na, SO₃Na) | —N(C₂H₅)₂ |
| 16 | —N(CH₂CH₂OH)₂ | —OCH₃ |
| 17 | —NH—(benzene ring with SO₃Na, SO₃Na) | morpholino (N—O ring) |
| 18 | —NHCH₂CH₂OCH₂CH₂OH | —OCH₃ |
| 19 | —N(CH₂—CH(OH)—CH₃)₂ | —N(CH₂—CH(OH)—CH₃)₂ |

EXAMPLE 20

A bath which contains, per liter of hard water, 1 g of the fluorescent brightener solution according to Example 1 and 5 g of sodium sulfate is prepared. A cotton fabric is introduced into this bath in a liquor ratio of 1:25 at 20° C. The bath is warmed to 50° C. in the course of 15 minutes and this temperature is maintained for a further 15 minutes. The treated fabric is rinsed for 30 seconds in cold running water and then dried at 150° C. with an iron.

The fabric thus treated has a powerful white effect.

Similar effects are also achieved if metal catalysts are present in the liquor and if the fluorescent brightener solutions of Examples 2 to 4 are used.

If a mixed fabric of polyester and cotton is used instead of cotton, the amount of fluorescent brightener is adjusted according to the proportion of cotton.

EXAMPLE 21

A bath which contains, per liter of hard water, 1 g of the fluorescent brightener solution according to Example 1 and 3 g of a mixture of sodium hydrosulfite and sodium pyrophosphate is prepared.

A polyamide 6,6 warp-knitted fabric is introduced into the bath in a liquor ratio of 1:20 at 40° C. The bath is warmed to 97° C. in the course of 30 minutes, kept at this temperature for 30 minutes and then cooled to 40° C. in the course of 15 minutes. The treated fabric is rinsed in cold running water for 30 seconds and then dried at 180° C. with an iron.

The fabric thus treated has a powerful white effect.

Similar effects are also achieved if metal catalysts are present in the liquor and if the fluorescent brightener solutions of Examples 2 and 3 are used.

EXAMPLE 22

A cotton fabric is padded at 20° C. with a hard water liquor which contains, per liter, 10 g of the fluorescent brightener solution according to Example 1, to a liquor pick-up of 75%. The treated fabric is then dried at 130° C. for 30 seconds.

The fabric thus treated has a powerful white effect.

Similar results are also obtained if the fluorescent brightener solutions of Examples 2 to 4 are used.

EXAMPLE 23

A polyamide 6,6 warp-knitted fabric (unset) is padded at 20° C. with a hard water liquor which contains, per liter, 10 g of the fluorescent brightener solution according to Example 1, 2 g of sodium hexametaphosphate, 15 g of a polyethylene glycol with a molecular weight of about 600 and 5 ml of 80% acetic acid, to a liquor pick-up of 110%. The treated fabric is then heat-set at 190° C. for 40 seconds.

The fabric thus treated has a powerful white effect.

Similar results are achieved if the fluorescent brightener solutions of Examples 2 and 3 are used.

EXAMPLE 24

50 g of bleached cellulose (10% suspension) are stirred with 99 ml of water and 1 ml of 10% aluminium sulfate solution in a metal beaker. After 2 minutes, 7.5 ml of a 10% filler suspension (kaolin) are added and after 10 minutes 0.036 g of the solution obtained according to Example 5 is added. 2 ml of 5% resin size solution and 1.5 ml of 10% aluminium sulfate solution are added at intervals of a further 2 minutes in each case. The mixture is then made up to 500 ml with water and the suspension is transferred to a mixing beaker, made up to 1,000 ml with water and mixed for 2 seconds. Processing of the pulp to paper sheets, including pressing and drying, is carried out in a known manner.

The paper thus obtained has a powerful white effect with good fastness to light.

EXAMPLE 25

50 g of bleached cellulose (10% suspension) are stirred with 99 ml of water and 1 ml of 10% aluminium sulfate solution in a metal beaker. After 2 minutes, 7.5 ml of a 10% filler suspension (kaolin) are added and after 10 minutes 0.1 g of the solution obtained according to Example 2 is added. 2 ml of 5% resin size solution and 1.5 ml of 10% aluminium sulfate solution are added at intervals of a further 2 minutes in each case. The mixture is then made up to 500 ml with water and the suspension is transferred to a mixing beaker, made up to 1,000 ml with water and mixed for 2 seconds. Processing of the pulp to paper sheets, including pressing and drying, is carried out in a known manner.

The paper thus obtained has a powerful white effect with good fastness to light.

EXAMPLE 26

A pigment coating liquor of the following composition is prepared: 150 ml of a 50% aqueous dispersion of a synthetic resin based on a crosslinkable methyl acrylate/styrene copolymer, 100 ml of water containing 2 g of sodium polyphosphate, 600 ml of water containing 40 g of the solution obtained according to Example 2, 50 ml of water containing 2 g of nonylphenol-pentadecaglycol ether and 500 g of aluminium magnesium silicate.

A sized and weighted sulfite cellulose raw paper is coated with this treatment liquor and then dried. A paper with very high whiteness is thus obtained.

What is claimed is:

1. A stilbene fluorescent brightener solution which is stable to metal ions and metal catalysts and stable on storage, which contains a stilbene fluorescent brightener containing sulfonic acid groups and a stabilising fatty amine oxyalkylation product of the formula $$Q'-N\begin{cases} (CH_2-CH_2-O)_{m}SO_3NH_4 \\ (CH_2-CH_2-O)_{n}SO_3NH_4 \end{cases}$$

in which Q' is the hydrocarbon radical of tallow fat amine and m and n are integers, the sum of m+n being 6 to 8.

2. A fluorescent brightener solution according to claim 1, which contains, as the fluorescent brightener, the compound of the formula <chemical structure: phenyl-CH=CH-phenyl-phenyl-CH=CH-phenyl with SO₃M'' and M''O₃S substituents> in which M'' is hydrogen or sodium.

* * * * *